(12) United States Patent
Zeng et al.

(10) Patent No.: US 9,769,606 B2
(45) Date of Patent: Sep. 19, 2017

(54) SYSTEMS AND METHODS FOR DETERMINING NETWORK ACCESS POINT LOCATIONS

(71) Applicant: GM GLOBAL TECHNOLOGY OPERATIONS LLC, Detroit, MI (US)

(72) Inventors: Shuqing Zeng, Sterling Heights, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/722,566

(22) Filed: May 27, 2015

(65) Prior Publication Data
US 2016/0353242 A1    Dec. 1, 2016

(51) Int. Cl.
*H04W 64/00*  (2009.01)
*H04W 4/02*   (2009.01)
*H04W 4/04*   (2009.01)

(52) U.S. Cl.
CPC ........... *H04W 4/023* (2013.01); *H04W 4/046* (2013.01)

(58) Field of Classification Search
CPC ..................................................... H04W 64/00
USPC ............................................ 455/456.1–456.6
See application file for complete search history.

(56) References Cited

U.S. PATENT DOCUMENTS

| 2005/0037775 | A1  | 2/2005  | Moeglein et al. |
|---|---|---|---|
| 2011/0059752 | A1* | 3/2011  | Garin ................. G01S 5/0289 455/456.1 |
| 2014/0269441 | A1  | 9/2014  | Hyde et al. |
| 2014/0273924 | A1  | 9/2014  | Hyde et al. |
| 2014/0274056 | A1  | 9/2014  | Hyde et al. |
| 2014/0274078 | A1  | 9/2014  | Hyde et al. |
| 2015/0057018 | A1* | 2/2015  | Moeglein .............. G01S 5/0036 455/456.1 |
| 2016/0353242 | A1  | 12/2016 | Zeng et al. |

OTHER PUBLICATIONS

Zeng, S., U.S. Appl. No. 14/656,305 entitled "Systems and Methods for Resolving Positional Ambiguities Using Access Point Information," filed Mar. 12, 2015.
German Patent and Trade Mark Office, Examination Report for German Patent Application No. 10 2016 104 547.0 mailed Feb. 20, 2017.

(Continued)

*Primary Examiner* — Michael T Vu
(74) *Attorney, Agent, or Firm* — Lorenz & Kopf, LLP

(57) ABSTRACT

A positioning method for a mobile platform includes acquiring GPS position data associated with the mobile platform from a plurality of GPS satellites observable by the mobile platform. A set of wireless range measurements associated with the mobile platform and a plurality of wireless access points in communication with the mobile platform are received (e.g., via time-of-flight measurements). Wireless position data associated with the plurality of wireless access points is received from a server communicatively coupled to the mobile platform over a network. A corrected position of the mobile platform based on the wireless position data, the wireless range measurements, and the GPS position data.

17 Claims, 3 Drawing Sheets

(56) References Cited

OTHER PUBLICATIONS

Liqiang Xu, et al., "Vehicle Positioning Using Wi-Fi Networks and GPS/DR System," 2009 Fifth International Conference on Mobile Ad-hoc and Sensor Networks, Fujian, 2009, pp. 287-293; retrieved on Feb. 20, 2017 from: URL: http://ieeexplore.ieee.org/stamp/stamp.jsp?tp=&arnumber=5401524&isnumber=5401465.

Soumaya Zirari, et al., "WiFi GPS based Combined positioning Algorithm," 2010 IEEE International Conference on Wireless Communications, Networking and Information Security, Beijing, China, 2010, pp. 684-688; retrieved on Feb. 20, 2017 from: URL: http://ieeexplore.ieee.org/stamp/stamp.jsp?tp=&arnumber=5544653&isnumber=5541718.

USPTO, Final Office Action in U.S. Appl. No. 14/656,305 mailed Jan. 25, 2017.

USPTO, Office Action in U.S. Appl. No. 14/656,305 mailed Jun. 27, 2016.

USPTO, Notice of Allowance and Fee(s) Due for U.S. Appl. No. 14/656,305 dated Jun. 7, 2017.

\* cited by examiner

SYSTEMS AND METHODS FOR DETERMINING NETWORK ACCESS POINT LOCATIONS

TECHNICAL FIELD

The technical field generally relates to network access points, and more particularly relates to systems and methods for determining the location of network access points in an environment.

BACKGROUND

Recent years have seen a dramatic increase in the use of mobile platforms incorporating both wireless networking capabilities (e.g., WiFi) and global positioning system (GPS) capabilities. Such mobile platforms include, for example, mobile computing devices (such as laptop computers, tablet computers, smartphones, etc.) and various systems of transportation (automotive vehicles, buses, motorcycles, and the like). In instances where GPS information is not available, or when it is not desirable to enable the GPS capabilities of such mobile platforms (e.g., due to battery life concerns), the position of the mobile platform may be estimated using information relating to one or more network access points (e.g., "WiFi" access points conforming to one or more of the IEEE 802.11 family of standards) within range of the mobile platform. That is, if it is determined that a mobile platform is within range of multiple access points with known geographical locations, and those ranges are known (e.g., through time-of-flight measurements) the position of the mobile platform itself may be estimated based on the range information. The accuracy of such position estimates are limited, however, by the accuracy of the access point positions themselves. While a manual survey of available access points may be performed to populate a database of access point positions, such a method may be susceptible to errors when, for example, one or more of the access points are relocated.

Accordingly, it is desirable to provide improved systems and methods for estimating and storing the position of network access points in an environment. Additional desirable features and characteristics of the present invention will become apparent from the subsequent detailed description and the appended claims, taken in conjunction with the accompanying drawings and the foregoing technical field and background.

SUMMARY

An access point position learning method in accordance with one embodiment includes acquiring first GPS position data associated with a first mobile platform and acquiring a first wireless range measurement associated with the first mobile platform and a wireless access point in communication with the first mobile platform. A first estimated position of the wireless access point is determined based on the first GPS position data and the first wireless range measurement. Second GPS position data associated with a second mobile platform is acquired, and a second wireless range measurement associated with the second mobile platform and the wireless access point is acquired. A second estimated position of the wireless access point is then determined based on the first estimated position, the second GPS position data, and the second wireless range measurement.

An access point position learning module in accordance with one embodiment generally includes a processor and a memory. The memory is configured to store software instructions that, when executed by the processor, cause the processor to: acquire first GPS position data associated with a first mobile platform; acquire a first wireless range measurement associated with the first mobile platform and a wireless access point in communication with the first mobile platform; determine a first estimated position of the wireless access point based on the first GPS position data and the first wireless range measurement; acquire second GPS position data associated with a second mobile platform; acquire a second wireless range measurement associated with the second mobile platform and the wireless access point; and determine a second estimated position of the wireless access point based on the first estimated position, the second GPS position data, and the second wireless range measurement.

DESCRIPTION OF THE DRAWINGS

The exemplary embodiments will hereinafter be described in conjunction with the following drawing figures, wherein like numerals denote like elements, and wherein.

DETAILED DESCRIPTION

The subject matter described herein generally relates to systems and methods for estimating the locations of network access points in an environment using a self-learning technique applied to information received from multiple mobile platforms. In this way, by "crowd-sourcing" position information from many mobile platforms and continually refining the value of the position information over time, a more robust and accurate database of access point positions may be provided. In that regard, the following detailed description is merely exemplary in nature and is not intended to limit the application and uses. Furthermore, there is no intention to be bound by any expressed or implied theory presented in the preceding technical field, background, brief summary or the following detailed description. As used herein, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
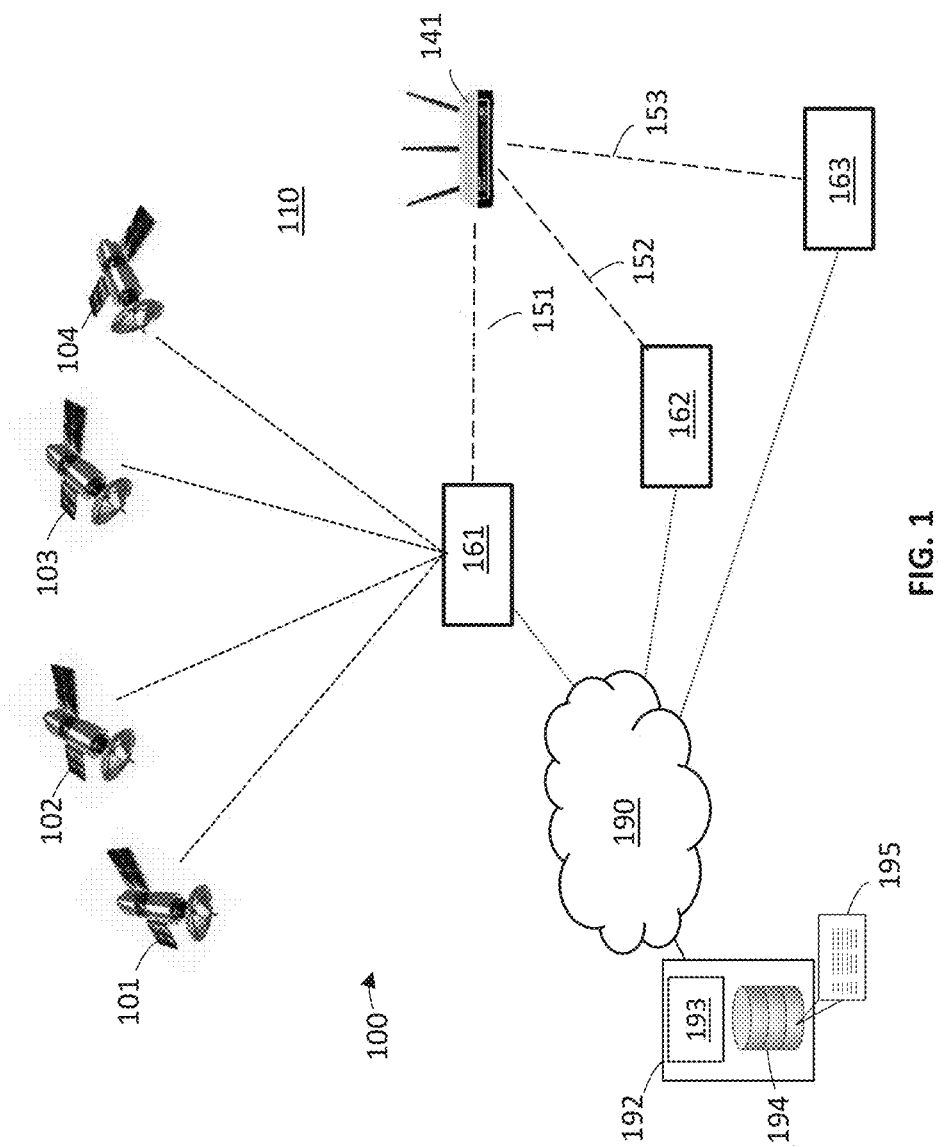
FIG. 1 is a conceptual block diagram of an access point positioning system in accordance with various embodiment.

Referring to FIG. 1, a positioning system 100 in accordance with one embodiment generally includes a number of mobile platforms 161, 162, and 163 in communication with (e.g., within range of) a wireless access point ("APs") 141, where dotted lines 151, 152, and 153 designate, respectively, the distance or "range" from mobile platforms 161, 162, and 163 to AP 141. Mobile platforms 161-163 may include, for example, mobile computing devices, such as laptop computers, tablet computers, smartphones, etc., and systems of transportation, such as vehicles, which can include buses, motorcycles, trains, marine vessels, aircraft, rotorcraft and the like. Mobile platforms 161-163 are also capable of communicating with, and determining a position of the mobile platforms 161-163 with respect to environment 110, using one or more positioning satellites (e.g., GPS satellites) 101-104.

Mobile platforms 161-163 are further configured to communicate with a backend server (or simply "server") 192 over a network 190. As described in further detail below, server 192 includes a database 194 configured to store positional data 195 associated with AP 141 as determined via mobile platforms 161-163. That is, server 192 knows, within some range of accuracy (as described further below), the geographical position of AP 141 as determined by a position learning module (or "learning module") 193 that is configured to receive from mobile platforms 161-163 information regarding their respective positions (determined, for example, via GPS satellites 101-104) as well as information regarding ranges 151-153, and thereby continually refine and "learn" the location of access point 141 automatically. In this regard, it will be appreciated that any number of mobile platforms may be within range of access point 141 at any given time, and that FIG. 1 is not intended to be limiting. For example, thousands of vehicles or other mobile platforms might, on a day-to-day basis, fall within range of access point 141 (e.g., if access point 141 is located near a busy street). Furthermore, a single mobile platform (e.g., mobile platform 161) may, over time, be within range of access point 141 on multiple occasions and with varying positions within environment 110 such that, in conjunction with learning module 193, it may assist with refining the position of access point 141 on its own.

Wireless access point 141 may be implemented as any form of network component configured to provide wireless access to a network (e.g., a local area network or the Internet). In accordance with one embodiment, AP 141 is implemented as an access point conforming to one or more of the IEEE 802.11 family of standards (e.g., "WiFi"). In one embodiment, wireless access point 141 is implemented as what is often termed a "next-gen" WiFi AP that includes the capability of determining range measurement using time-of-flight techniques. That is, mobile platforms 161-163 are configured to determine ranges 151-153, respectively, based on the time required for signals to "echo" back and forth between mobile platforms 161-162 and AP 141.

In general, GPS satellites 101-104 broadcast microwave signals that allow GPS receivers (e.g., mobile platforms 161-163) on or near the Earth's surface (in environment 110) to determine the location of the GPS satellites 101-104 as well as a synchronized time value. GPS signals, as are known in the art, generally include ranging signals (i.e., pseudorange, carrier phase, and Doppler), used to measure the distance and change rate of distance to the respective satellites (101-104), as well as various navigation messages. The navigation messages include, for example, ephemeris data (used to calculate the position of each satellite 101-104 in orbit) and information about the time and status of the entire satellite constellation—i.e., the "almanac." In general, such information is referred to herein collectively as "GPS position data." In one embodiment, the GPS position data is provided relation to an earth-centered, earth-fixed (ECEF) coordinate frame, as is known in the art.

While FIG. 1 illustrates four satellites 101-104, it will be appreciated that the mobile platforms 161-163 may, depending on the conditions, observe a greater or lesser number of such satellites. While it is generally desirable that at least four GPS satellites be observable at all times (to provide suitably accurate position data), in the case of urban canyon environments and the like it is not unusual for only two or three satellites to be observable. Under such conditions, as mentioned above, the position data derived from satellites 101-104 may be ambiguous. In such cases, however—using again the example of an urban canyon environment—there may be many APs (such as 141) within range of one of the mobile platforms 161-163 (e.g., within a neighborhood with a dense concentration of access points). These APs will serve as additional satellites for assist mobile platforms to position themselves.

Position data 195, as mentioned briefly above, includes information regarding access point 141 (as well as any number of additional access points), and may take the form of any suitable data structure known in the art, such as a SQL database, a flat-file database, an associative array, or the like. In one embodiment, position data 195 includes the estimated position of access point 141 (e.g., the current, best guess as to the position of access point 141 relative to any convenient reference frame), a unique identifier for access point 141, and statistical data associated with the first estimated position (e.g., a confidence level associated with the estimate and covariance matrix indicating the accuracy of the estimate). In one embodiment, the position data 195 is a table that includes a unique media access control (MAC) address for each currently known wireless access point, the estimated position of each wireless access point, and statistical distribution data associated with the first estimated position. This exemplary table structure is illustrated below for an example access point 141 having a MAC ID "00:50:56:cf:e3:01", a position p (expressed as x, y, and z coordinates in any convenient reference frame), a number of measurements n corresponding to how many range measurements (such as range 151) have been processed by learning module 193 for access point 141, and a statistical distribution expressed, in this embodiment, as a tuple of values R and z, each corresponding to a portion of an "information array" as described in further detail below.

| MAC Id | Position | No. of Measurements | Distribution |
|---|---|---|---|
| 00:50:56:cf:e3:01 | p = (X, Y, Z) | n | [R, z] |
| ... | ... | ... | ... |
| ... | ... | ... | ... |

In one embodiment, the position of an AP (such as 141) is modeled as a Gaussian distributed multivariate with the mean p and covariance matrix $\Sigma$, wherein the information array [R, z] is defined as $R^T R = \Sigma^{-1}$, and z=Rp.

Figure 2:
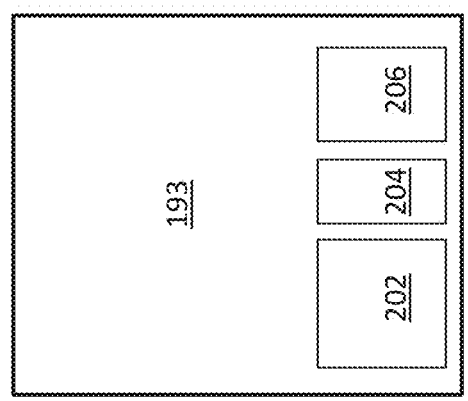
FIG. 2 is a conceptual block diagram of a position learning module in accordance with various embodiments.

Referring now to FIG. 2 in conjunction with FIG. 1, a more detailed block diagram of learning module 193 in accordance with an exemplary embodiment will be described. In general, learning module 193 includes a processor 202 (e.g. a microprocessor, microcontroller, etc.), a memory component 204 (e.g., RAM, ROM, etc.), and storage component 206 (e.g., a solid-state drive (SSD), a convention hard-drive, or the like). Processor 202 is configured to execute software instructions stored in memory component 204 to provide the functionality described herein.

In general, the learning module 193 is, in general, configured to iteratively determine and refine an estimate of the position of access point 141 based on information crowd-sourced from the multiple mobile platforms 161-163. This is illustrated conceptually in FIG. 3. In one example, a refinement function 306 (implemented within the learning module 193) receives as input two sets of data: a previous estimate 304 of the location of access point 141 (e.g., position information 195 for access point 141 as stored in database 194), and a "current" estimate 302 related to access point 141 (e.g., ranges 151-153 and GPS position data for mobile platforms 161-163). Using this information, the refinement function 306 produces an updated or "improved" estimate 308, which then becomes the new value for "previous" estimate 304. Refinement function 306 may operate on estimates 302 and 304 at specified times, at regular intervals, or when a predetermined amount of current estimates 302 are available.

Figure 4:
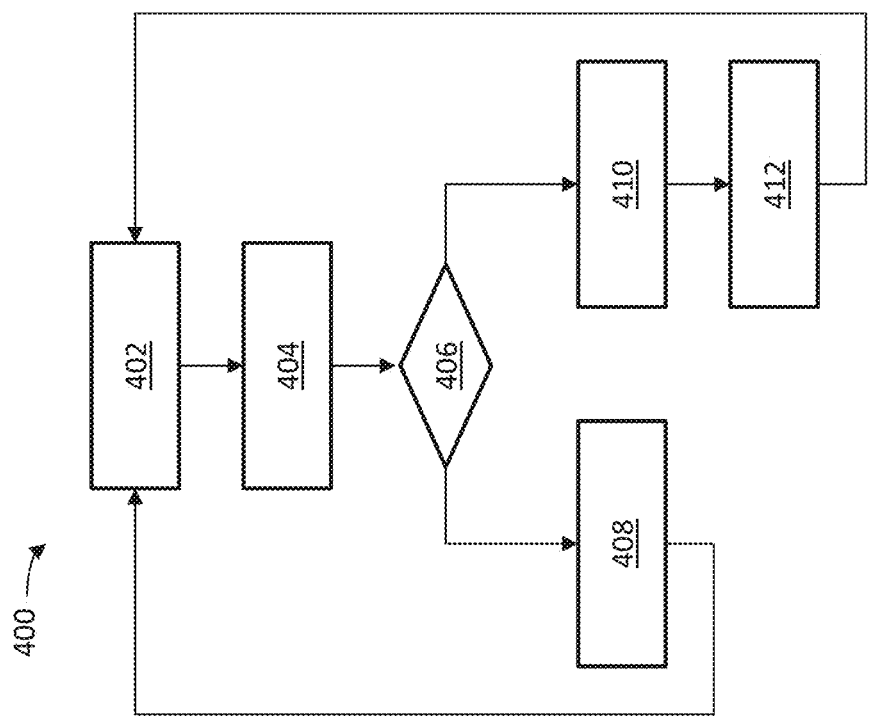
FIG. 4 is a flowchart depicting a position learning method in accordance with various embodiments.

Having thus given an overview of the positioning system 100 and the learning module 193 in accordance with one embodiment, FIG. 4 is a flowchart depicting a learning method 400 in accordance with various embodiments, and will, without loss of generality, be described in conjunction with the embodiment shown in FIG. 1.

Initially, at 402, position information is received by the learning module 193 from the various mobile platforms 161-163 operating within environment 110. This packet of information will generally include the GPS position data associated with mobile platforms 161-163 as well as the range measurements 151-153. Next, at 404, the packets of information are organized in a manner consistent with the position information 195—e.g., as a table including a MAC ID of access point 141, an identifier of the corresponding mobile platforms 161-163, and an aggregate of the measurements made with respect to access point 141 within a predetermined time window.

Next, at 406, it is determined whether an estimated position is actually available for access point 141 within database 194. That is, in some cases—particularly when a new access point is installed in environment 110—position information 195 may not include the MAC address or other unique identifier associated with that access point 141. If an estimated position is not available for the access point 141, the learning module 193 proceeds to 408 and initializes database 194 with an initial estimate of the location of access point 141. In one embodiment, this initial estimate is assumed to be the sample mean of all positional estimates derived from ranges 151-153 (as well as the corresponding GPS position data), and the confidence interval associated with that initial estimate is assumed to be a variance derived from the signal-to-noise ration of the measurements. Subsequently, processing continues with 402 after some predetermined interval (e.g., 1.0 to 60.0 minutes).

If, at 406, it was determined that an estimated position (i.e., a prior positional estimate) is available within database 194, the learning module 193 proceeds to 410. At 410, the learning module 193 combines the aggregated range and GPS information received from mobile platforms 161-163 with the prior estimate (as described in further detail below with reference to FIG. 4), and produces, at 412, a "new" estimate of the position of mobile platform 161, which is then stored, along with statistical information related to the estimate, within database 194. Subsequently, processing continues with 402 after some predetermined interval (e.g., approximately 1.0 to 60.0 minutes).

An exemplary position learning method will now be described in detail. In general, the task of the learning module 193 is to take the prior estimated position of mobile platform 161 as stored within database 194, which is given as $\tilde{p}=(\tilde{X}, \tilde{Y}, \tilde{Z},)$ (corresponding to predicted x, y, and z coordinates within environment 110) and determine a new or "posterior" estimate $p=(X, Y, Z)$. The estimated positions of mobile platforms 161-163 are thus expressed as $(p_1, p_2, \ldots, p_N)$, with some uncertainty captured in the covariance matrices $(\Sigma_1, \Sigma_2, \ldots, \Sigma_N)$. The corresponding range measurements between the mobile platform and the access point are $(\rho_1, \rho_2, \ldots, \rho_N)$ (e.g., range measurements 151-153) and signal-noise ratio $(s_1, s_2, \ldots, s_N)$, for $k=1, \ldots, N$. For the k-th mobile platform, the position distribution can be written as information array $p_k \sim [R_k, z_k]$, for $k=1, \ldots, N$.

The uncertainty of the range measurements (e.g., 151-153) depends on the signal-noise ratio. For an exemplary embodiment, the variance of the range measurement $\rho_k$ from the k-th mobile platform is denoted as $\sigma_k$ and can be calculated as $$\sigma_k = \frac{c\tau}{2.5\sqrt{2s_k}}$$

where $s_k$ the signal-noise ratio for time-of-flight measurement $\rho_k$, c is the speed of light, and $\tau$ is the width of pulse in time-of-flight measure mechanism.

In order to find out the initial position p for access point 141 such that the following quantity is minimized:

$$\sum_{k=1}^{N}\left[\left(\frac{\|p-p_k\|-\rho_k}{\sigma_k}\right)^2 + \|R_k p_k - z_k\|^2\right]$$

Given the nomenclature set forth above, the predicted range measurement is $\tilde{\rho}_k=\sqrt{(\tilde{X}-X_k)^2+(\tilde{Y}-Y_k)^2+(\tilde{Z}-Z_k)^2}$ between the access point 141 and k-th mobile platform $p_k=(X_k, Y_k, Z_k)^T$. Error is defined between predicted and actual range measurement as $\Delta\rho_k=\rho_k-\tilde{\rho}_k$ and a set of 1×3 sensitive matrices $H_{w,k}=\tilde{p}^T/(\sigma_k\tilde{\rho}_k)$ and $H_k=-(1\ 1\ 1)/(\sigma_k\tilde{\rho}_k)$. These sensitive matrices are gain factors that determine the amount needed for a change of position for access point 141 in order to reduce the error. The normalized measurement from k-th platform is $o_k=(\Delta\rho_k+H_{w,k}\tilde{p})/\sigma_k$; for $k=1, 2, \ldots, N$. The following matrix A can be constructed:

$$A = \begin{pmatrix} R_1 & 0 & \cdots & 0 & 0 & z_1 \\ 0 & R_2 & \cdots & 0 & 0 & z_2 \\ \vdots & \vdots & \ddots & \vdots & \vdots & \vdots \\ 0 & 0 & \cdots & R_N & 0 & z_N \\ H_1 & 0 & \cdots & 0 & H_{w,1} & o_1 \\ 0 & H_2 & \cdots & 0 & H_{w,2} & o_2 \\ \vdots & \vdots & \ddots & \vdots & \vdots & \vdots \\ 0 & 0 & \cdots & H_N & H_{w,N} & o_N \end{pmatrix}$$

At this point, applying a "Givens rotation" as is known in the art (e.g., a rotation in the plane spanned by two rows of the matrix A) to the lower rectangular entries defined by $H_1$ to $o_N$, a triangular matrix $R_A$ is formed as:

$$R_A = \begin{pmatrix} R'_1 & 0 & \cdots & 0 & \alpha & z'_1 \\ 0 & R'_2 & \cdots & 0 & \beta & z'_2 \\ \vdots & \vdots & \ddots & \vdots & \vdots & \vdots \\ 0 & 0 & \cdots & R'_N & \gamma & z'_N \\ 0 & 0 & \cdots & 0 & R & z \\ 0 & 0 & \cdots & 0 & 0 & e \\ \vdots & \vdots & \ddots & \vdots & \vdots & \vdots \\ 0 & 0 & \cdots & 0 & 0 & 0 \end{pmatrix}$$

Note that $R_A$ is an upper triangular matrix derived from A, i.e., $A=QR_A$ and Q is an orthogonal matrix of appropriate dimension.

The updated position of access point 141 has a statistical distribution [R, z] where R is the 3×3 submatrix from $R_A$ (at row N+1 and column N+1), and z the 3×1 submatrix from $R_A$ (at row N+1 and column N+2). The posterior position expectation (mean) is $p=R^{-1}z$, and the scalar e is the least-squares residue. Next, let $\tilde{p}=p$ (e.g., set the "prior" estimate to the new, improved estimate). Reconstructing the matrix A above and applying triangulation process, the updated position of access point 141 can be computed in L iterations (e.g., L=5), or until it converges. Measurements in the most recent time window can now be discarded (since the parameters [R, z] are a sufficient statistic) if these measurements are not needed by other access points for positioning.

After initialization (e.g., block 408 in FIG. 4), during subsequent learning, the learning module 193 takes as its input range measurements, i.e., $\rho_1, \rho_2, \ldots, \rho_N$, the corresponding mobile platform position distribution in information array form, i.e., $p_1 \sim [R_1, z_1], p_2 \sim [R_2, z_2], \ldots, p_N \sim [R_N, z_N]$, the predicted access point 141 position $\tilde{p}=(\tilde{X}, \tilde{Y}, \tilde{Z})^T$, and the prior distribution of the access point 141 $p \sim [\tilde{R}, \tilde{z}]$. The output is then posterior distribution for the position of access point 141, p~[R,z], and its updated position $p=R^{-1}z$.

Figure 3:
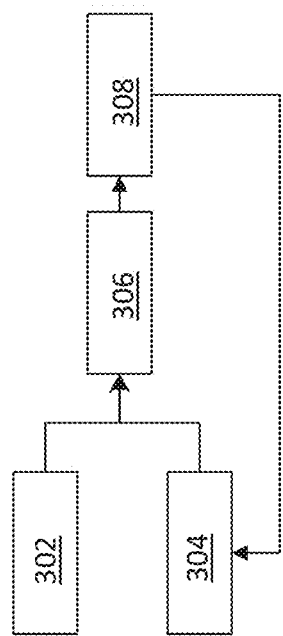
FIG. 3 is a conceptual flow diagram of a position learning method in accordance with various embodiments.

The refinement function 306 in FIG. 3 is adapted to determine the posterior position p such that the following quantity is minimized:

$$\sum_{k=1}^{N} \left[ \left( \frac{\|p - p_k\| - \rho_k}{\sigma_k} \right)^2 + \|R_k p_k - z_k\|^2 \right] + \|\tilde{R}p - \tilde{z}\|$$

With arrival of a new packet of measurements from mobile platforms 161-163 (e.g., 402 in FIG. 4), let $\tilde{\rho}_k = \sqrt{(\tilde{X}-X_k)^2+(\tilde{Y}-Y_k)^2+(\tilde{Z}-Z_k)^2}$; $p_k=(X_k, Y_k, Z_k)^T$; $\Delta\rho_k=\rho_k-\tilde{\rho}_k$; 1×3 matrices $H_{w,k}=\tilde{p}^T/(\sigma_k\tilde{\rho}_k)$, $H_k=-(1\ 1\ 1)/(\sigma_k\tilde{\rho}_k)$; and $o_k=(\Delta\rho_k+H_{w,k}\tilde{p})/\sigma_k$. For k=1, 2, ..., N. A new matrix A' can be constructed as:

$$A' = \begin{pmatrix} R_1 & 0 & \ldots & 0 & 0 & z_1 \\ 0 & R_2 & \ldots & 0 & 0 & z_2 \\ \vdots & \vdots & \ddots & \vdots & \vdots & \vdots \\ 0 & 0 & \ldots & R_N & 0 & z_N \\ 0 & 0 & \ldots & 0 & \tilde{R} & \tilde{z} \\ H_1 & 0 & \ldots & 0 & H_{w,1} & o_1 \\ 0 & H_2 & \ldots & 0 & H_{w,2} & o_2 \\ \vdots & \vdots & \ddots & \vdots & \vdots & \vdots \\ 0 & 0 & \ldots & H_N & H_{w,N} & o_N \end{pmatrix}$$

Next, a Givens rotation is applied as above to the entries ranging from $H_1$ to $o_N$, producing an upper triangular matrix as follows:

$$R'_A = \begin{pmatrix} R'_1 & 0 & \ldots & 0 & \alpha & z'_1 \\ 0 & R'_2 & \ldots & 0 & \beta & z'_2 \\ \vdots & \vdots & \ddots & \vdots & \vdots & \vdots \\ 0 & 0 & \ldots & R'_N & \gamma & z'_N \\ 0 & 0 & \ldots & 0 & R & z \\ 0 & 0 & \ldots & 0 & 0 & e \\ \vdots & \vdots & \ddots & \vdots & \vdots & \vdots \\ 0 & 0 & \ldots & 0 & 0 & 0 \end{pmatrix}$$

The posterior position distribution for access point 141 is then p~[R, z], and the posterior position expectation (mean) for access point 141 is $p=R^{-1}z$. The learning module 192 then discards the used measurements and treats the posterior position estimate as the prior position estimate (304 in FIG. 3) for the next update cycle.

It will be appreciated that while the embodiments described above have been described in the context of vehicular mobile platforms, the range of embodiments is not so limited. For example, the systems and methods described above can be used to determine the location of APs in a building using mobile devices carried by individuals as they travel through the building.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An access point position learning method, comprising:
    acquiring first GPS position data associated with a first mobile platform;
    acquiring a first wireless range measurement associated with the first mobile platform and a wireless access point in communication with the first mobile platform;
    determining a first estimated position of the wireless access point based on the first GPS position data and the first wireless range measurement;
    acquiring second GPS position data associated with a second mobile platform;
    acquiring a second wireless range measurement associated with the second mobile platform and the wireless access point;
    determining a second estimated position of the wireless access point based on the first estimated position, the second GPS position data, and the second wireless range measurement;
    wherein acquiring the first wireless range measurement includes determining a distance from the first mobile platform to the wireless access point using WiFi time-of-flight measurement information provided by the wireless access point.

2. The access point position learning method of claim 1, further including storing, in a database remote from the first mobile platform, position data including a media access control (MAC) address of the wireless access point, the first estimated position of the wireless access point, and statistical data associated with the first estimated position.

3. The access point position learning method of claim 2, wherein the statistical data includes a count of a plurality of range measurements and a statistical distribution characterizing the range measurements.

4. The access point position learning method of claim 3, wherein the statistical distribution characterizing the range measurements is a Gaussian-distributed multivariate with a mean p and a covariance matrix $\Sigma$.

5. The access point position learning method of claim 1, wherein the first mobile platform is a vehicle.

6. The access point position learning method of claim 1, wherein the first mobile platform is a mobile computing device.

7. An access point position learning module comprising:
a processor;
a memory configured to store software instructions that, when executed by the processor, cause the processor to:
  acquire first GPS position data associated with a first mobile platform;
  acquire, using WiFi time-of-flight measurement information provided by the wireless access point, a first wireless range measurement associated with the first mobile platform and a wireless access point in communication with the first mobile platform;
  determine a first estimated position of the wireless access point based on the first GPS position data and the first wireless range measurement;
  acquire second GPS position data associated with a second mobile platform;
  acquire a second wireless range measurement associated with the second mobile platform and the wireless access point; and
  determine a second estimated position of the wireless access point based on the first estimated position, the second GPS position data, and the second wireless range measurement.

8. The access point position learning module of claim 7, wherein the processor is further configured to receive, from a database remote from the first mobile platform, position data including a media access control (MAC) address of the wireless access point, the first estimated position of the wireless access point, and statistical data associated with the first estimated position.

9. The access point position learning module of claim 8, wherein the statistical data includes a count of a plurality of range measurements and a statistical distribution characterizing the range measurements.

10. The access point position learning module of claim 9, wherein the statistical distribution characterizing the range measurements is a Gaussian-distributed multivariate with a mean p and a covariance matrix $\Sigma$.

11. The access point position learning module of claim 7, wherein at least one of the first mobile platform and the second mobile platform is a mobile computing device.

12. The access point position learning module of claim 7, wherein at least one of the first mobile platform and the second mobile platform is a vehicle.

13. A non-transitory computer-readable media including software instructions that, when executed by a processor, cause the processor to:
  acquire first GPS position data associated with a first mobile platform;
  acquire a first wireless range measurement associated with the first mobile platform and a wireless access point in communication with the first mobile platform by determining a distance from the first mobile platform to the wireless access point using WiFi time-of-flight measurement information provided by the wireless access point;
  determine a first estimated position of the wireless access point based on the first GPS position data and the first wireless range measurement;
  acquire second GPS position data associated with a second mobile platform;
  acquire a second wireless range measurement associated with the second mobile platform and the wireless access point; and
  determine a second estimated position of the wireless access point based on the first estimated position, the second GPS position data, and the second wireless range measurement.

14. The non-transitory computer-readable media of claim 13, wherein the software instructions cause the processor to receive, from a database remote from the first mobile platform, position data including a media access control (MAC) address of the wireless access point, the first estimated position of the wireless access point, and statistical data associated with the first estimated position.

15. The non-transitory computer-readable media of claim 14, wherein the statistical data includes a count of a plurality of range measurements and a statistical distribution characterizing the range measurements.

16. The non-transitory computer-readable media of claim 15, wherein the statistical distribution characterizing the range measurements is a Gaussian-distributed multivariate with a mean p and a covariance matrix $\Sigma$.

17. The non-transitory computer-readable media of claim 13, wherein the first mobile platform is selected from the group consisting of a vehicle and a mobile computing device.

* * * * *